(12) United States Patent
Sweeney, II

(10) Patent No.: US 7,256,682 B2
(45) Date of Patent: Aug. 14, 2007

(54) REMOTE IDENTIFICATION OF CONTAINER CONTENTS BY MEANS OF MULTIPLE RADIO FREQUENCY IDENTIFICATION SYSTEMS

(75) Inventor: Patrick J. Sweeney, II, Philomont, VA (US)

(73) Assignee: Odin Technologies, Inc., Dulles, VA (US)

(*) Notice: Subject to any disclaimer, the term of this patent is extended or adjusted under 35 U.S.C. 154(b) by 440 days.

(21) Appl. No.: 10/707,511

(22) Filed: Dec. 18, 2003

(65) Prior Publication Data

US 2005/0134433 A1 Jun. 23, 2005

(51) Int. Cl.
*H04Q 5/22* (2006.01)
*G08B 5/22* (2006.01)
(52) U.S. Cl. ............... 340/10.1; 340/10.4; 340/825.35; 340/825.49

(58) Field of Classification Search ............... 340/10.1, 340/825.49, 525.54, 825.35, 10.4
See application file for complete search history.

(56) References Cited

U.S. PATENT DOCUMENTS

| | | | | |
|---|---|---|---|---|
| 5,959,568 | A * | 9/1999 | Woolley | 342/42 |
| 6,724,308 | B2 * | 4/2004 | Nicholson | 340/572.1 |
| 6,803,856 | B1 * | 10/2004 | Murphy et al. | 340/572.1 |
| 6,894,600 | B2 * | 5/2005 | Phelan | 340/10.34 |
| 6,927,687 | B2 * | 8/2005 | Carrender | 340/539.26 |
| 7,009,517 | B2 * | 3/2006 | Wood | 340/572.1 |

* cited by examiner

*Primary Examiner*—Jeffery Hofsass
*Assistant Examiner*—Scott Au

(57) ABSTRACT

A method and apparatus for performing the remote identification of the contents of containers by means of multiple radio frequency identification systems.

18 Claims, 4 Drawing Sheets

REMOTE IDENTIFICATION OF CONTAINER CONTENTS BY MEANS OF MULTIPLE RADIO FREQUENCY IDENTIFICATION SYSTEMS

BACKGROUND OF INVENTION

This invention relates to a method and apparatus for performing the remote, real-time identification of the contents of containers by means of multiple radio frequency identification systems.

Radio Frequency ID (RFID) systems allow for the identification of objects at a distance and out of line of sight. They are comprised of transponders called radio frequency (RF) tags and RF interrogators (also called readers). The tags are smaller, sometimes as small as a grain of rice, less expensive than interrogators, and are commonly attached to objects such as product packages in stores. When an interrogator comes within range of an RF tag, it may provide power to the tag via a querying signal, or the RF tag may use stored power from a battery or capacitor to send a radio frequency signal to be read by the RFID interrogator.

RF tags may consist of single integrated circuits, circuits and antennae, or may incorporate more complex capabilities such as computation, data storage, and sensing means. Some categories of RFID tags include the following: passive tags that acquire power via the electromagnetic field emitted by the interrogator, semi-passive tags that respond similarly, but also use on-board stored power for other functions, active tags that use their own stored power to respond to an interrogator's signal, inductively coupled tags that operate at low frequencies and short distances via a coil antenna, single or dipole antenna-equipped tags that operate at higher frequencies and longer distances, read-write tags that can alter data stored upon them, full-duplex or half duplex tags, collision arbitration tags that may be read in groups, or non-collision tags that must be read individually.

RFID systems present a number of advantages over other object marking and tracking systems. A radio frequency interrogator may be able to read a tag when it is not in line of sight from the interrogator, when the tag is dirty, or when a container obscures the tag. RFID systems may identify objects at greater distances than optical systems, may store information into read/write tags, do not require a human operator, and may read tags hidden from visual inspection for security purposes. These advantages make RFID systems useful for tracking objects.

Generally, less expensive RFID systems have lesser capabilities. For instance, passive tags may have very low cost per unit, facilitating widespread use, but they also have limited range. RFID systems may also fail when applied to groups of objects, containers of multiple objects, or nested containers of objects. For shipping and warehousing of large containers on pallets, which often contain nested containers, inexpensive passive tags on individual objects may not provide adequate identification rates. Human manipulation of such objects may afford acceptable identification rates, but it also increases the cost of identifying each object. Active tags have greater range, but they may be impractical in many instances because of cost, shelf life, RF interference or other reasons. There is a need for a system that allows for the use of multiple tag types for groups of objects in potentially mobile containers that delivers a high read rate under a variety of conditions, at a distance, and at a reasonable cost. Such a system presents an advantage over prior art by surmounting compatibility issues presented by environments equipped with RFID systems of one type that need to process items tagged by a system of a different type.

U.S. Pat. No. 6,127,928 discloses an apparatus and method for a radio frequency document control system that enables the location of documents, such as office files, to be automatically and rapidly identified. The apparatus differs from this invention in a number of regards: the intermediate transceiver is not attached to a mobile container or described as operating while in motion; it requires a personal computer or other computation means to process the identity of documents; and its order of communication between transceivers does not allow for switched, efficient scanning of a container's content.

U.S. Pat. No. 6,529,446 discloses an interactive medication container or console that holds or otherwise organizes one or more medication vials or containers. The system automatically acquires information from memory strips on the vials or containers that is then made available to an external data processing system. It differs from this invention in several important regards: the medication container does not communicate via RFID with the external world, and the invention does not facilitate the rapid remote inventory of a mobile container.

U.S. Pat. Application No. 2002/0183882 A1 discloses a point of sale and delivery method and system using communication with remote computer and having features to read a large number of tags. The system resembles that disclosed in U.S. Pat. No. 6,529,446. It automatically acquires information from tags on the products within a container and then presents them to an external data processing system. It differs from this invention in several important regards: the external container does not communicate its contents via RFID with the external world. Instead, it uses, in one embodiment, an external RFID system to restrict access to the container. The invention does not provide the advantage of translating between incompatible RFID systems. The invention does not provide the advantage of effective remote inventory of clustered or nested containers via an external RFID system.

SUMMARY OF INVENTION

This invention relates to a method and apparatus for enabling the remote, real-time identification of the contents of containers by means of multiple radio frequency identification (RFID) systems.

One embodiment of the apparatus comprises a container, an on-board interrogator with a mobile stored power means, a mechanical electrical switch affixed to the container's opening, an externally accessible radio frequency (RF) tag, multiple tags affixed to objects sufficiently small to lie within the container, and an external interrogator or interrogators which communicate with the apparatus's externally accessible RF tag.

When the container is closed, the mechanical switch, which is affixed to its opening, signals to the on-board interrogator that it should function for a preset period of time. The interrogator then queries RF tags within its interior and reads their IDs into stored memory within the externally accessible RF tag attached to the container. When the external interrogator polls the externally accessible RF tag or detects the externally accessible RF tag's beacon, it acquires the inventory of the internal tags that was established at the time the container was closed. Because the externally accessible RF tag may be an active tag with significant stored power, a potentially more effective frequency, and with less shielding by the container walls, it may have a much greater range and capacity to surmount obstacles than the RF tags within the container. The structure of the container, externally accessible RF tag, and antenna may be confignred such that a desired successful read rate can be achieved given known configurations of containers. The apparatus allows for automatic translation between RFID systems: while the container's interior may be populated with RF tags that cannot by read by an external interrogator, as long as the externally accessible RF tag is compatible, the entire group represented by the container and its contents may be inventoried by the external interrogator.

Another embodiment of the apparatus comprises a small mobile container such as an attache case, RFID tags, on-board interrogator, and a remote RFID interrogator. Another embodiment comprises a large mobile container such as a cargo container or vehicle or trailer, RFID tags, on-board interrogator, and a remote RFID interrogator. Another embodiment comprises a kit of components that may be used to retrofit existing containers of various sizes to give them the desired identification capabilities. Many embodiments of the invention are suitable for nested use.

The foregoing general description and the following detailed description are exemplary and explanatory only and do not restrict the claims directed to the invention. The accompanying drawings, which are incorporated in and constitute a part of this specification, illustrate some embodiments of the invention and together with the description, serve to explain the principles of the invention.

DETAILED DESCRIPTION

The following detailed description of embodiments of this invention and the attached figures are intended to provide a clear description of the invention without limiting its scope.

Figure 1:
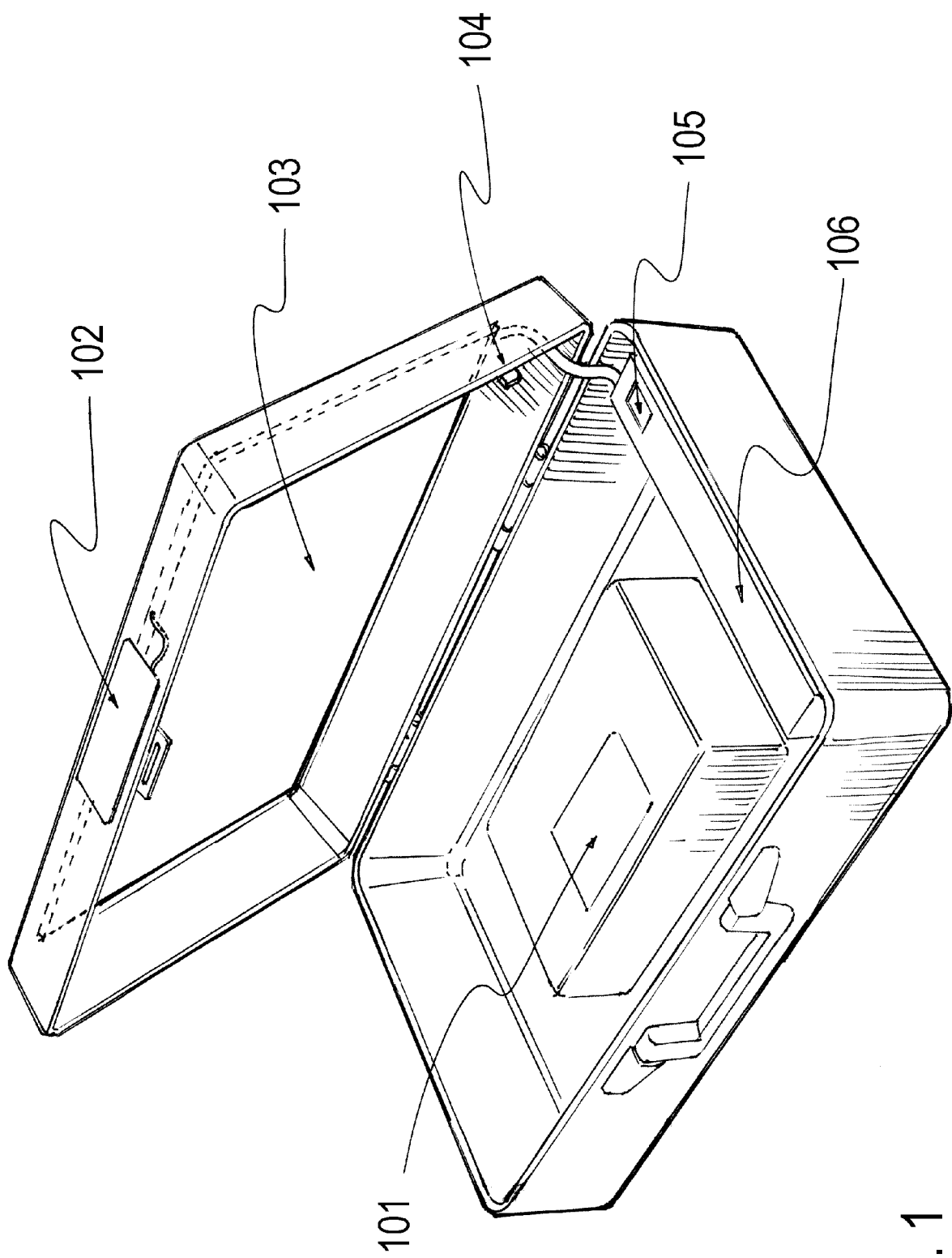
FIG. 1 is a diagram illustrating an embodiment incorporated in an attache case.

FIG. 1 is a diagram illustrating an embodiment of the invention, incorporated in an attache case. The RF tag 101 is attached to an object or objects within the attache case. In this embodiment, the RF tag 101 is a passive tag operating at 125 kHz, 13.56 MHz, or 900 MHz. The shape of the objects within the attache, the shape of the attache, and the orientations of the RF tags with respect to the objects and the interrogator/interrogator antenna 103 ensure that the rate of successful read operations performed by the interrogator upon the interior objects is optimal. In an alternate embodiment, compartments or dividers or multiple interrogators might perform the same function for containers and objects of different geometries. Externally accessible RF tag 102 is an active or semi-passive tag that contains an inventory of the tags contained within the attache as the identification code that it passes to external interrogators, either by beacon or in response to a polling signal from an interrogator. The externally accesible RF tag 102 may also be made to respond to activation of a physical switch or at preset time intervals or for a period after a triggering event. Tab 104 toggles electrical switch 105 when the attache is opened or when the attache is closed. Switch 105 initiates interrogation by interrogator/interrogator antenna 103, powered by stored power means 106, comprising an electric battery, fuel cell, or other stored power means. Data storage means and optional data processing means may reside in 103 or 106. The components other than the container may collectively represent a kit that can be added to an ordinary container to give it the advantages presented by this invention.

Figure 2:
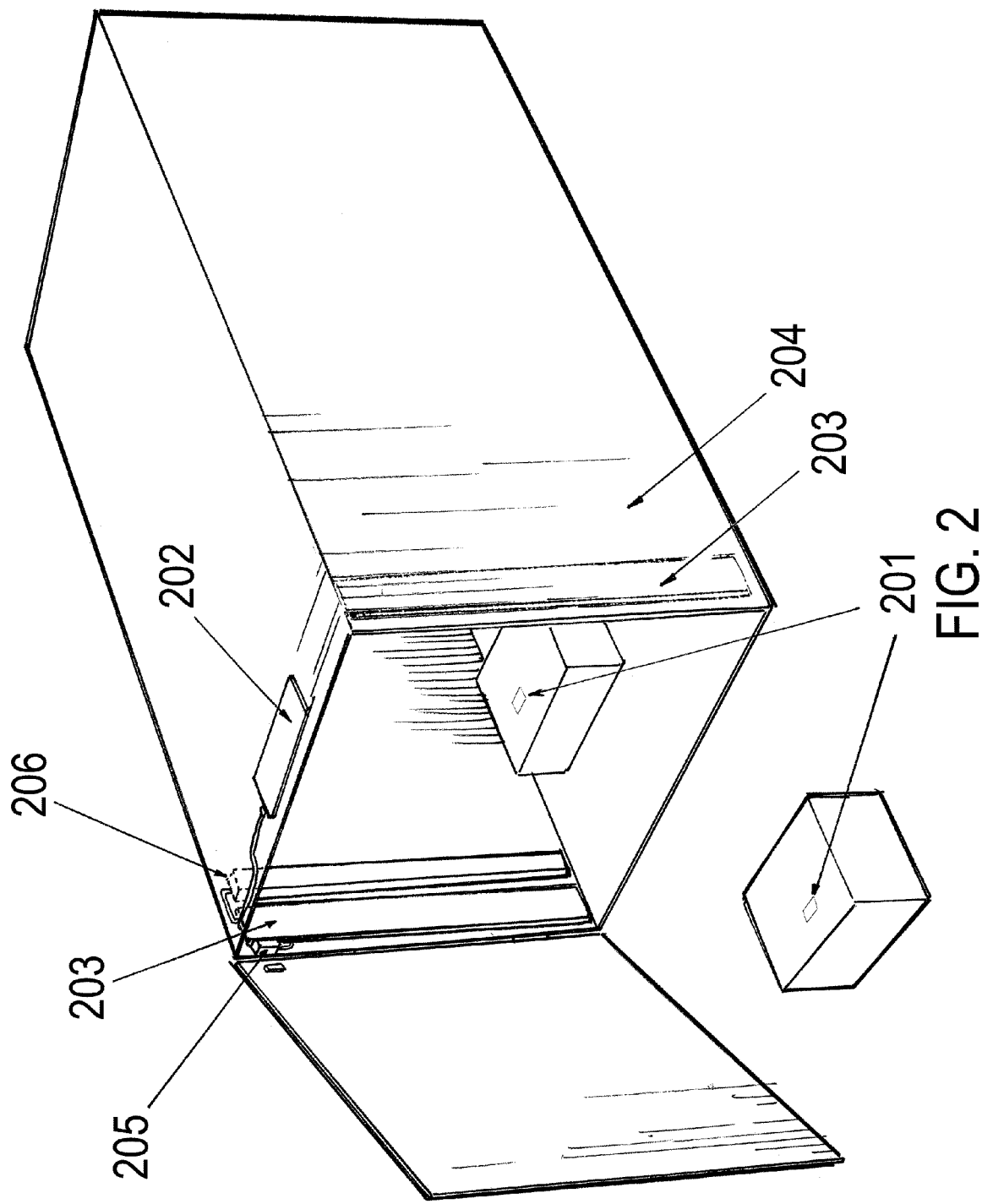
FIG. 2 is a diagram illustrating an embodiment incorporated in a large container.

FIG. 2 is a diagram illustrating an embodiment incorporated in a large container.

The RF tag 201 is attached to an object or objects within the container 204. In this embodiment, the RF tag 201 is a passive tag operating at 125 kHz, 13.56 MHz, or 900 MHz. Externally accessible RF tag 202 is an active or semi-passive tag that contains an inventory of the tags contained within the container as the identification code that it passes to external interrogators, either by beacon or in response to a polling signal from an interrogator. The externally accessible RF tag 202 may also be made to respond to activation of a physical switch or at preset time intervals or for a period after a triggering event. When the container door opens or when a motion sensor is tripped, electrical switch 205 is toggled. Switch 205 initiates interrogation by either of the two interrogator/interrogator antenna 203, powered by stored power means 206, comprising an electric battery, fuel cell, or other stored power means or by optional externally supplied power. Data storage means and optional data processing means may reside in 202. The components other than the container may collectively represent a kit that can be added to an ordinary container to give it the advantages presented by this invention.

Figure 3:
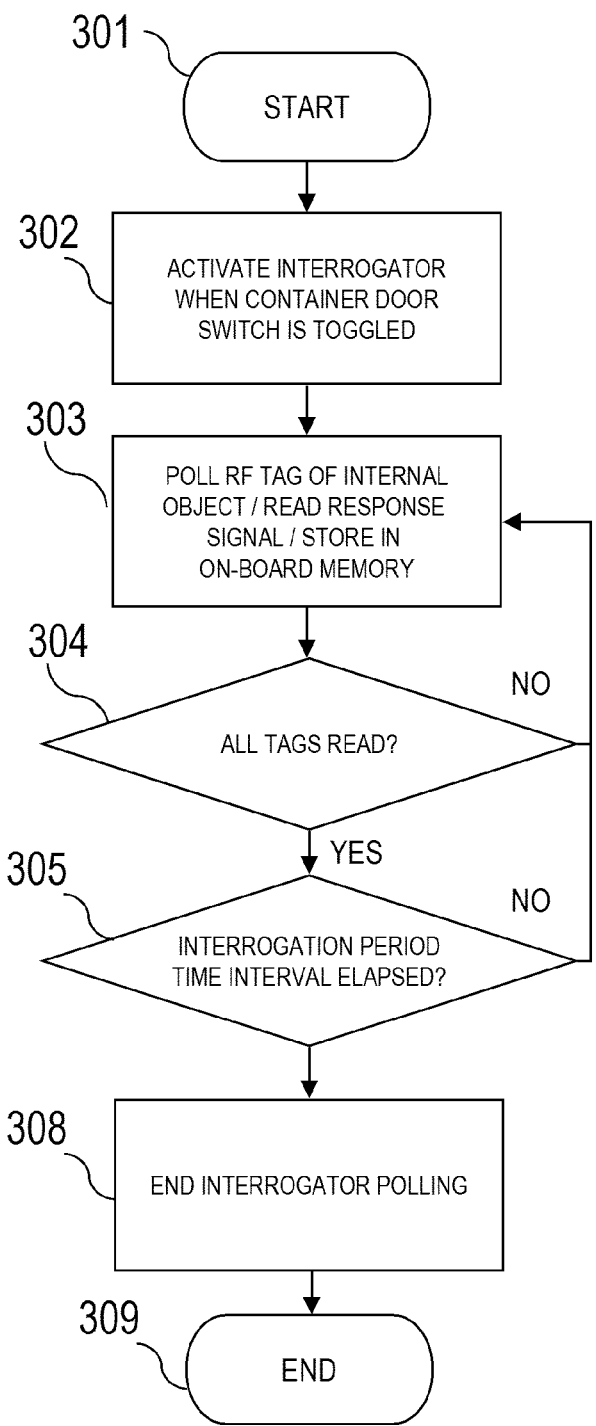
FIG. 3 is a flowchart illustrating an operating cycle typical of inventorying the container.

FIG. 3 is a flowchart illustrating an operating cycle typical of inventorying the container. In 301, the cycle is initiated, generally when the apparatus is powered on or the stored power means is recharged or refueled. In 302, the apparatus is in a power conserving state, waiting for the container door switch to toggle it into inventory acquiring mode. In other embodiments a motion sensor or timer circuit might trigger the acquisition of inventory. In 303, once the apparatus has entered inventory acquiring mode, it polls the RF tags attached to internal objects, reads the RF tags' response signals, and stores the identification values into the on-board memory means, such as EEPROM memory. In 304, the apparatus checks to see if additional tags are available within the container for reading. If so, control returns to 303. If not, then control proceeds to 305, where a test is made for whether the interrogation period time interval has elapsed. If not, then control is returned to 303. If so, then the apparatus ends internal interrogator polling, returning to power conserving mode and ending the inventorying cycle.

Figure 4:
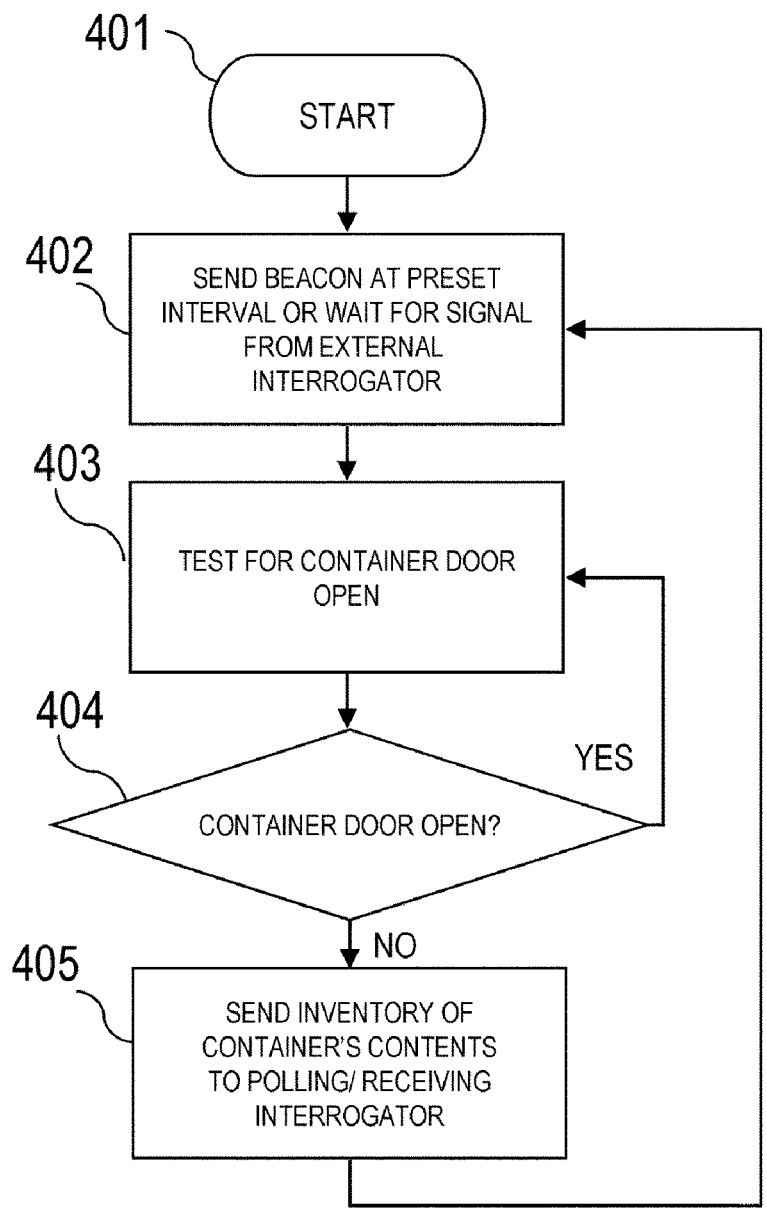
FIG. 4 is a flowchart illustrating an operating cycle typical of remotely acquiring the inventory of the container.

FIG. 4 is a flowchart illustrating an operating cycle typical of remotely acquiring the inventory of the container. The cycle begins in 401, generally after the inventorying cycle of FIG. 3. In 402, either the externally accessible RF tag sends a beacon at preset intervals or waits for a signal from an external interrogator, depending on the RF tag type or mode of operation. In 403, once a polling signal has been detected, the apparatus performs a test to determine whether the container door is open. In 404, control returns to 403 if the door is open to prevent transmission of erroneous inventory information. If the container door is closed, control proceeds to 405, whereupon the apparatus sends the inventory of the container's contents to the external interrogator.

The invention claimed is:

1. An apparatus, comprising:
   a radio frequency tag configured to be coupled to an object within a container;

an interior radio frequency identification interrogator configured to be coupled to an interior portion of the container and configured to acquire an inventory-related information associated with the radio frequency tag;

a data storage means; and an externally accessible radio frequency tag coupled to an exterior portion of the container, the interior radio frequency identification interrogator configured to transfer the inventory-related information to the data storage means, the interior radio frequency identification interrogator configured to transfer the inventory-related information to the externally accessible radio frequency tag, the externally accessible radio frequency tag configured to send an indicator of the inventory-related information to an external radio frequency identification interrogator when interrogated by the external radio frequency identification interrogator, the externally accessible radio frequency tag being prevented from sending the indicator to the external radio frequency identification interrogator when the container is open.

2. The apparatus of claim 1, wherein the externally accessible radio frequency tag is at least one of an active tag or a semi-passive tag, the data storage means being included in the externally accessible radio frequency tag.

3. An apparatus, comprising:

a radio frequency tag configured to be coupled to an object within a container;

an interior radio frequency identification interrogator configured to be coupled to an interior portion of the container and configured to acquire an inventory-related information associated with the radio frequency tag;

a data storage means; and an externally accessible radio frequency tag coupled to an exterior portion of the container, the interior radio frequency identification interrogator configured to transfer the inventory-related information to the data storage means, the interior radio frequency identification interrogator configured to transfer the inventory-related information to the externally accessible radio frequency tag, the externally accessible radio frequency tag configured to send an indicator of the inventory-related information to an external radio frequency identification interrogator when interrogated by the external radio frequency identification interrogator, the interior radio frequency identification interrogator being triggered to acquire the inventory-related information in response to the container being closed.

4. The apparatus of claim 3, wherein the interior radio frequency identification interrogator is triggered to acquire the inventory-related information in response to at least one of a signal from a motion sensor or a signal produced by a timer.

5. An apparatus, comprising:

a radio frequency tag configured to be coupled to an object within a container;

an interior radio frequency identification interrogator configured to be coupled to an interior portion of the container and configured to acquire an inventory-related information associated with the radio frequency tag;

a data storage means; and an externally accessible radio frequency tag coupled to an exterior portion of the container, the interior radio frequency identification interrogator configured to transfer the inventory-related information to the data storage means, the interior radio frequency identification interrogator configured to transfer the inventory-related information to the externally accessible radio frequency tag, the externally accessible radio frequency tag configured to send an indicator of the inventory-related information to an external radio frequency identification interrogator when interrogated by the external radio frequency identification interrogator, the interior radio frequency identification interrogator includes an interrogator antenna coupled to the externally accessible radio frequency tag.

6. An apparatus, comprising:

a radio frequency tag configured to be coupled to an object within a container;

an interior radio frequency identification interrogator configured to be coupled to an interior portion of the container and configured to acquire an inventory-related information associated with the radio frequency tag;

a data storage means; and an externally accessible radio frequency tag coupled to an exterior portion of the container, the interior radio frequency identification interrogator configured to transfer the inventory-related information to the data storage means, the interior radio frequency identification interrogator configured to transfer the inventory-related information to the externally accessible radio frequency tag, the externally accessible radio frequency tag configured to send an indicator of the inventory-related information to an external radio frequency identification interrogator when interrogated by the external radio frequency identification interrogator, the externally accessible radio frequency tag being configured to change from a power-conserving mode to an inventory-acquiring mode when a switch that is configured to be attached to the container is toggled in response to the container being closed, the externally accessible radio frequency tag using the interior radio frequency identification interrogator when in the inventory-acquiring mode to acquire the inventory-related information during an interrogation time period.

7. An apparatus, comprising:

a radio frequency tag configured to be coupled to an object within a container;

an interior radio frequency identification interrogator configured to be coupled to an interior portion of the container and configured to acquire an inventory-related information associated with the radio frequency tag;

a data storage means; and an externally accessible radio frequency tag coupled to an exterior portion of the container, the interior radio frequency identification interrogator configured to transfer the inventory-related information to the data storage means, the interior radio frequency identification interrogator configured to transfer the inventory-related information to the externally accessible radio frequency tag, the externally accessible radio frequency tag configured to send an indicator of the inventory-related information to an external radio frequency identification interrogator when interrogated by the external radio frequency identification interrogator, the inventory-related information acquired from the radio frequency tag being translated by the externally-accessible radio frequency tag from a signal that is incompatible with the external radio frequency identification interrogator into a signal that is compatible with the external radio frequency identification interrogator.

8. A method, comprising:

acquiring information associated with a radio frequency tag disposed within a container using an interior radio frequency interrogator disposed within the container, the acquiring being triggered when the container changes from being open to closed, the radio frequency tag coupled to an object disposed within the container; and transferring the information to an exterior radio frequency tag disposed exterior to the container, the exterior radio frequency tag configured to send an inventory indicator to an external interrogator, the inventory indicator being based on the information.

9. The method of claim 8, further comprising:

preventing the exterior radio frequency tag from sending the inventory indicator to the external interrogator when the container is open.

10. The method of claim 8, wherein the interior radio frequency interrogator is an interior interrogator antenna used by the exterior radio frequency tag to acquire the information, the exterior radio frequency tag is coupled to the interior interrogator antenna.

11. The method of claim 8, wherein the acquiring includes acquiring during an interrogation time period, a start of the interrogation time period is defined when the container changes from being open to closed.

12. The method of claim 8, wherein the radio frequency tag is a passive radio frequency tag.

13. The method of claim 8, wherein the container is a first container disposed inside of a second container, the interior radio frequency interrogator is a first interior radio frequency interrogator, the exterior radio frequency tag is a first exterior radio frequency tag disposed within the second container, the method further comprising:

acquiring information associated with the first exterior radio frequency tag using a second interior radio frequency interrogator disposed within the second container and disposed exterior to the first container; and transferring the information associated with the first exterior radio frequency tag to a second exterior radio frequency tag disposed exterior to the second container.

14. The method of claim 8, wherein the acquiring includes acquiring at a first time, the method, further comprising:

sending the information at a second time to the external interrogator as a beacon signal after a preset time interval has elapsed, the sending being prevented when the container is open, the second time being after the first time.

15. The method of claim 8, further comprising:

receiving at the exterior radio frequency tag a polling signal from the external interrogator at a first time when the container is open, the polling signal being a request for the inventory information; and sending the inventory information at a second time to the external interrogator when the container is closed, the second time being after the first time.

16. An apparatus, comprising:

an exterior radio frequency tag disposed exterior to a container and configured to send an inventory indicator to an external interrogator, the inventory indicator indicating inventory information associated with a group of radio identification tags disposed within the container; and an interior interrogator coupled to the exterior radio frequency tag and configured to be disposed within an interior portion of the container, the interior interrogator configured to poll during an interrogation time period each radio identification tag from the group of radio identification tags to acquire an identification of each radio identification tag from the group of radio identification tags, the inventory information being based on the identification of each radio identification tag, the interrogation time period triggered by at least one of a toggling of a switch when the container is closed, a toggling of the switch when the container is opened, a signal from a motion sensor, or a signal from the external interrogator.

17. The apparatus of claim 16, wherein a radio identification tag from the group of radio identification tags is configured to be attached to an object, at least one of the object or the radio identification tag is oriented within the container to facilitate the acquiring by the interior interrogator.

18. An apparatus, comprising:

an exterior radio frequency tag disposed exterior to a container and configured to send an inventory indicator to an external interrogator, the inventory indicator indicating inventory information associated with a group of radio identification tags disposed within the container, the exterior radio frequency tag being prevented from sending the inventory indicator to the external interrogator when the container is open; and an interior interrogator coupled to the exterior radio frequency tag and configured to be disposed within an interior portion of the container, the interior interrogator configured to poll during an interrogation time period each radio identification tag from the group of radio identification tags to acquire an identification of each radio identification tag from the group of radio identification tags, the inventory information being based on the identification of each radio identification tag.

* * * * *